(12) United States Patent
Young et al.

(10) Patent No.: US 11,247,841 B2
(45) Date of Patent: Feb. 15, 2022

(54) TRASH CONTAINMENT SYSTEMS AND METHODS

(71) Applicant: THE BOEING COMPANY, Chicago, IL (US)

(72) Inventors: Stephen M. Young, Mill Creek, WA (US); Brandon Wayne Freyling, Mukilteo, WA (US); Kevin Griffith Swanson, Lake Forest Park, WA (US)

(73) Assignee: THE BOEING COMPANY, Chicago, IL (US)

(*) Notice: Subject to any disclaimer, the term of this patent is extended or adjusted under 35 U.S.C. 154(b) by 234 days.

(21) Appl. No.: 16/001,380

(22) Filed: Jun. 6, 2018

(65) Prior Publication Data

US 2019/0375585 A1 Dec. 12, 2019

(51) Int. Cl.
*B64D 11/02* (2006.01)
*B65F 1/14* (2006.01)
*B65F 1/08* (2006.01)

(52) U.S. Cl.
CPC .............. *B65F 1/1426* (2013.01); *B65F 1/08* (2013.01); *B64D 11/02* (2013.01)

(58) Field of Classification Search
CPC ........ B65F 1/1426; B65F 1/08; B65F 1/1436; B65F 1/1452; B65F 1/1006
See application file for complete search history.

(56) References Cited

U.S. PATENT DOCUMENTS

| 2,564,485 | A | * | 8/1951 | Kurstin | E06B 3/90 312/292 |
| 2,597,782 | A | * | 5/1952 | Ferm | B65F 1/1442 312/283 |
| 3,285,686 | A | * | 11/1966 | Beaver | B65F 1/1442 312/329 |
| 3,458,243 | A | * | 7/1969 | Gefroh | B65F 1/1442 312/329 |
| 3,528,718 | A | * | 9/1970 | Braun | B65F 1/06 312/308 |
| 3,628,841 | A | * | 12/1971 | Sulcek | A47B 77/04 312/204 |
| 3,734,006 | A | * | 5/1973 | Hennells | B30B 9/3032 100/349 |
| 3,917,107 | A | * | 11/1975 | Bottas | B30B 9/3003 141/390 |
| 4,023,875 | A | * | 5/1977 | Difley | B30B 9/3003 312/319.1 |

(Continued)

FOREIGN PATENT DOCUMENTS

| EP | 3018076 A1 | * | 5/2016 | ............ B65F 1/1436 |
| JP | 2005154068 | | * 6/2005 | |
| WO | WO-2017043177 A1 | * | 3/2017 | ............... A62C 3/08 |

*Primary Examiner* — Kimberley S Wright
(74) *Attorney, Agent, or Firm* — The Small Patent Law Group LLC; Joseph M. Butscher (57) ABSTRACT

A trash containment system and method includes a container housing including one or more panels that define a retaining chamber within the container housing. The retaining chamber is configured to removably receive and retain a trash container. The container housing is configured to be retained within a compartment of a monument. A door is configured to be moved between an open position and a closed position. The retaining chamber is exposed in the open position and closed in the closed position.

20 Claims, 8 Drawing Sheets

(56) References Cited

U.S. PATENT DOCUMENTS

| | | | | |
|---|---|---|---|---|
| 4,719,852 A * | 1/1988 | Durbin | B30B 9/3014 | 100/229 A |
| 4,729,303 A * | 3/1988 | Durbin | B30B 9/3032 | 100/214 |
| 4,991,913 A * | 2/1991 | Roger | B65F 1/1436 | 312/275 |
| 5,172,630 A * | 12/1992 | Thompson | B30B 9/3075 | 100/193 |
| 5,215,365 A * | 6/1993 | Godin | B65F 1/1436 | 16/370 |
| 5,884,556 A * | 3/1999 | Klepacki | B30B 9/3053 | 100/229 A |
| 6,241,115 B1 * | 6/2001 | Delmerico | B65F 1/1415 | 220/495.06 |
| 7,191,701 B2 * | 3/2007 | Fukuizumi | B30B 9/3053 | 100/215 |
| 7,654,443 B1 * | 2/2010 | Fuller | B65F 1/06 | 220/908 |
| 9,415,873 B2 | 8/2016 | McIntosh | | |
| 10,822,089 B2 * | 11/2020 | Koyama | B64D 11/02 | |
| 10,829,219 B2 * | 11/2020 | Koyama | B64D 11/02 | |
| 2004/0163170 A1 * | 8/2004 | Cooper | B64D 11/02 | 4/664 |
| 2004/0227034 A1 * | 11/2004 | Wentland | B64D 11/02 | 244/119 |
| 2005/0257698 A1 * | 11/2005 | Fukuizumi | B30B 9/3053 | 100/233 |
| 2010/0231105 A1 * | 9/2010 | Latif | A47B 46/005 | 312/293.1 |
| 2011/0056393 A1 * | 3/2011 | Kachkovsky | B30B 15/041 | 100/45 |
| 2014/0021690 A1 | 1/2014 | Burd | | |
| 2015/0101499 A1 * | 4/2015 | Hitchcock | B30B 1/103 | 100/229 A |
| 2015/0298809 A1 * | 10/2015 | Minegishi | A62C 3/00 | 244/118.5 |
| 2018/0265202 A1 * | 9/2018 | Koyama | B65F 1/1426 | |
| 2020/0130842 A1 * | 4/2020 | Young | B64D 11/02 | |
| 2020/0130843 A1 * | 4/2020 | Young | B64D 11/02 | |
| 2020/0180767 A1 * | 6/2020 | Koyama | B64D 11/02 | |

* cited by examiner

TRASH CONTAINMENT SYSTEMS AND METHODS

FIELD OF THE DISCLOSURE

Embodiments of the present disclosure generally relate to trash containment systems and methods, such as may be used within an interior monument (for example, a lavatory) of a vehicle (for example, a commercial aircraft).

BACKGROUND OF THE DISCLOSURE

A lavatory is an interior monument within a commercial aircraft that provides passengers with privacy. That is, a lavatory may be an area onboard an aircraft in which passengers may avoid observation from others, such as flight attendants Aircraft lavatories are typically subject to safety requirements. For example, certain passengers may attempt to smoke cigarettes within an aircraft lavatory (which is an unauthorized, and possibly illegal practice) and discard cigarette butts into trash containers. As can be appreciated, a lit cigarette or match within a trash container may ignite trash (such as paper towels) therein. As such, trash containers within aircraft lavatories are subject to safety requirements ensuring that a fire can be controlled and/or contained therein.

Typically, lavatory trash containers are stand-alone units that include aluminum sheets welded together. The welded aluminum construction is effective in controlling and containing a fire. However, such a trash container is relatively heavy, and the welding process to form the waste compartment may be labor-intensive and costly.

SUMMARY OF THE DISCLOSURE

Certain embodiments of the present disclosure provide a trash containment system that includes a container housing including one or more panels that define a retaining chamber within the container housing. The retaining chamber is configured to removably receive and retain a trash container. The container housing is configured to be retained within a compartment of a monument. A door is configured to be moved between an open position and a closed position. The retaining chamber is exposed in the open position and closed in the closed position.

In at least one embodiment, the one or more panels include a first panel, and a second panel. The first panel and the second panel define the retaining chamber.

The door may form a front of the container housing. In at least one embodiment, the door includes an inlet that leads to the retaining chamber, and an access flap moveably secured to the inlet.

In at least one embodiment, a first panel provides a first lateral wall and a top wall, and a second panel connected to the first panel. The second panel provides a second lateral wall, a rear wall, and a base wall. The retaining chamber is defined by the first lateral wall, the top wall, the second lateral wall, the rear wall, and the base wall. The first panel and the second panel overlay at least portions of interior surfaces of one or both of the compartment or a wall of the monument.

Rails may be secured to interior surfaces of the panels. The rails are configured to retain the trash container within the retaining chamber. The rails may include a trash director that downwardly slopes from a top end towards a bottom end. The trash director is configured to direct trash towards the retaining chamber.

A seal may be around a front periphery of the panels. The seal provides a sealing interface between the panels and the door in the closed position.

The compartment may be defined by one or both of interior walls of a cabinet or one or more walls of the monument.

The trash containment system may also include a first latch coupled to the door, and a second latch coupled to the door.

The panels may be formed of a composite material. The composite material may include a core sandwiched between opposed first and second skins. The core may include a plurality of interconnected honeycomb cells.

Certain embodiments of the present disclosure provide a method of making a trash containment system. The method includes forming a container housing from one or more panels that define a retaining chamber within the container housing, and coupling a door adjacent the container housing such that the door forms a front of the container housing.

In at least one embodiment, the forming includes coupling a first panel and a second panel together to define the retaining chamber. The forming may include folding a first panel to define a first lateral wall and a top wall, and folding a second panel to define a second lateral wall, a rear wall, and a base wall. The second panel is connected to the first panel. The retaining chamber is defined by the first lateral wall, the top wall, the second lateral wall, the rear wall, and the base wall. The first panel and the second panel overlay at least portions of interior surfaces of one or both of a compartment or a wall of a lavatory.

The method may include coupling a first latch and a second latch to the door.

The method may include positioning rails on interior surfaces of the panels. The positioning the rails includes forming a trash director that downwardly slopes from a top end towards a bottom end. The trash director is configured to direct trash towards the retaining chamber. The rails are configured to securely retain the trash container within the retaining chamber.

The method may include positioning a seal around a front periphery of the one or more panels. The seal provides a sealing interface between the one or more panels and the door in the closed position.

Certain embodiments of the present disclosure provide an interior monument for use in a vehicle. The interior monument includes a cabinet having a compartment, and a trash containment system within the cabinet. The trash containment system includes a container housing including a first panel and a second panel formed of a composite material. The first panel and the second panel are formed and coupled together to define a retaining chamber. The retaining chamber is configured to removably receive and retain a trash container. The container housing is retained within the compartment. A door forms a front of the container housing and is configured to be moved between an open position and a closed position. The door is coupled to the cabinet adjacent the compartment.

The interior monument may also include a first latch positioned proximate to a bottom edge of the door, and a second latch positioned proximate to a top edge of the door. The first latch and the second latch are configured to latchably engage the first panel and the second panel.

DETAILED DESCRIPTION OF THE DISCLOSURE

The embodiments described herein provide a lightweight and cost effective trash container system that may be used onboard a vehicle, such as a commercial aircraft. Further, the trash container system described herein may be efficiently manufactured and installed onboard a vehicle. The herein-described trash container system can be used in any suitable interior monument, such as a lavatory, galley, crew rest, closet, or the like.

Embodiments of the present disclosure provide a trash containment system that includes a container housing including one or more panels that define a retaining chamber. The retaining chamber is configured to removably receive and retain a trash container. A door is configured to move between open and closed positions. The door may be decorative and form a front of a cabinet, for example. The panel(s) can be formed of a non-metal, composite material. The trash containment system is configured to be secured within a compartment of a lavatory, such as within an internal cabin of a vehicle (for example, a commercial aircraft).

The trash containment system meets and/or exceeds fire containment requirements, while at the same time having a reduced weight and cost (as compared to certain known prior trash containers). In at least one embodiment, two panels form the container housing. For example, a first panel and a second panel are formed and coupled together to define the retaining chamber. One or both of the panels may be folded to form the container housing. The door provides a front of the container housing without any additional panels or provisions, further reducing cost and weight. The panels may be quickly and easily replaced without affecting the surrounding lavatory unit.

By eliminating the need for a secondary access door, access to a trash container within the container housing can be improved, allowing for easier, more ergonomic cleaning. A trash access flap may be incorporated directly into the door, which can thereby further improve access for maintenance and cleaning.

In at least one embodiment, dual latches ensure that both a top and bottom of the door can remain tightly coupled to housing, which can thereby reduce the potential of air, oxygen, and/or other gases from entering the trash containment system. To further ensure minimal gaps between the door and the compartment, a fabric reinforced P-shaped seal (that is, a seal having an axial cross-section having a panel connected to an expanded arcuate extension at an end thereof) may be located around a periphery of the door.

The trash containment system may also include a chute that ensures that trash enters the trash container as intended. Rather than utilizing a welded stainless steel chute, an extruded portion (such as an extruded lip) may be used. The extruded portion not only ensures that trash enters the trash container, but also serves as a guide to properly position the trash container in the retaining chamber of the container housing. The chute may be sloped to direct the trash into the trash container. In at least one embodiment, the chute is a one piece extruded member.

Figure 1:
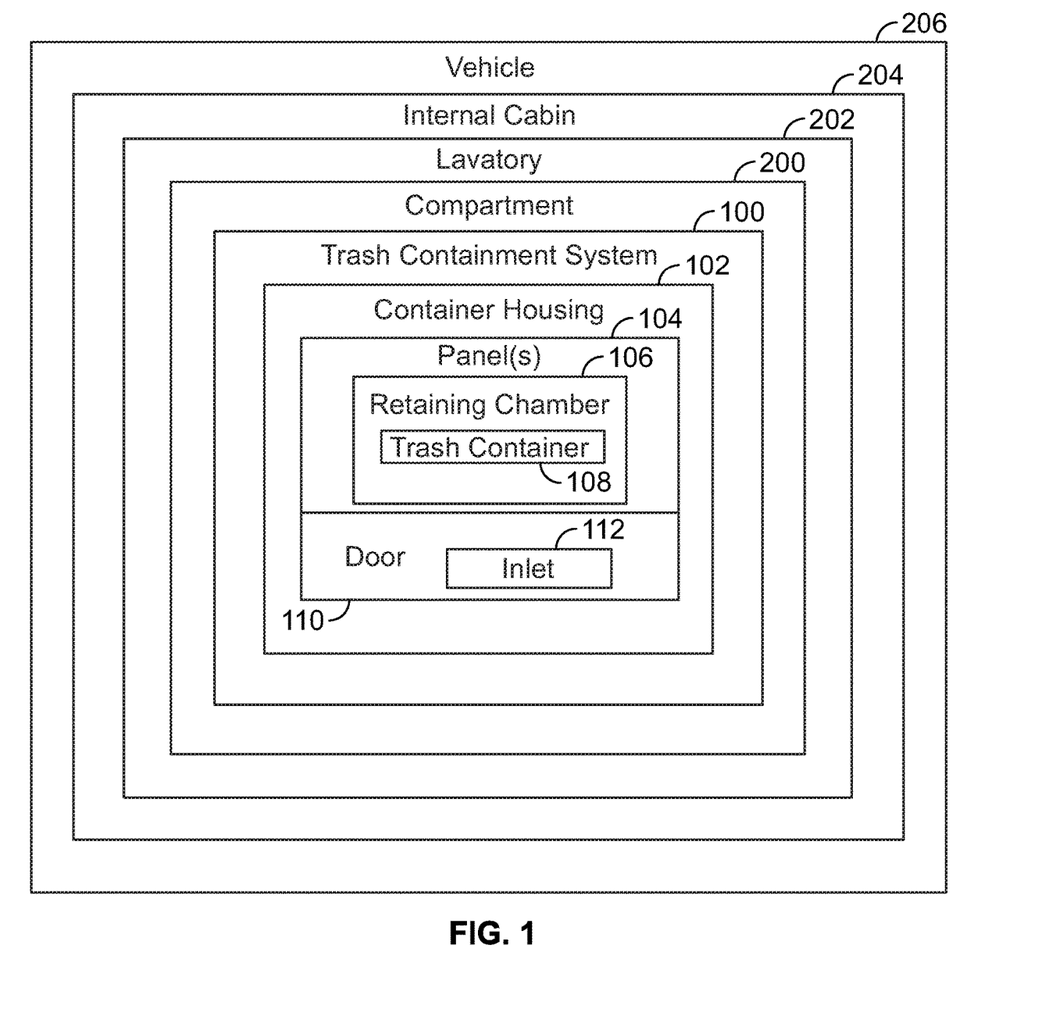
FIG. 1 illustrates a schematic block diagram of a trash containment system within a compartment of a lavatory within an internal cabin of a vehicle, according to an embodiment of the present disclosure.

FIG. 1 illustrates a schematic block diagram of a trash containment system 100 within a compartment 200 of a lavatory 202 within an internal cabin 204 of a vehicle 206, according to an embodiment of the present disclosure. The trash containment system 100 includes a container housing 102 including one or more panels 104 that define a retaining chamber 106. The retaining chamber 106 is configured to removably receive and retain a trash container 108. The container housing 102 is configured to be retained within a compartment 200. The trash containment system 100 also includes a door 110 that is configured to be moved between an open position and a closed position. The retaining chamber 106 is exposed in the open position and closed in the closed position. The panels 104 may be formed of a composite material, instead of metal.

The trash container 108, such as a bucket, bin, can, compactor or the like, may or may not retain a trash bag that receives trash (such as used paper towels). The trash container 108 may be configured to be selectively inserted into and removed from the retaining chamber 106.

The door 110 is positioned at a front of the container housing 102. The door 110 may be moveably secured to a portion of the panel(s) 104 and/or a fixed structure within an area (for example, a cabinet panel within a lavatory), such as through latched 333 and 335 (shown in FIG. 7). The door 110 is moveable between a closed position, in which the retaining chamber 106 is closed, and an open position, in which the retaining chamber 106 is open and exposed. The door 110 may be opened to remove the trash container 108, for example.

The door 110 may include an inlet 112 (or an inlet of a chute). The inlet 112 may include a moveable access flap that allows trash to be inserted into the inlet 112. The inlet 112 leads to the trash container 108. In this manner, trash that is inserted into the inlet 112 is deposited into the trash container 108.

The compartment 200 may be part of a cabinet, such as underneath a countertop, within the lavatory 202. The door 110 may provide a front moveable wall of the cabinet. The container housing 102 fits within the compartment 200. For example, the panel(s) 104 of the container housing 102 is/are positioned within spaces defined by one or more walls of the compartment 200 and/or the lavatory 202. For example, the panel(s) 104 may abut against portions of the walls of the compartment 200 and/or the lavatory 202. In this manner, the panel(s) 104 provide a protective barrier in relation to the compartment 200 and the lavatory 202. As such, in the unlikely event that a fire ignites within the trash containment system 100, the container housing 102 bears the brunt of any damage, instead of the compartment 200 and the lavatory 202. If the container housing 102 is damaged, the container housing 102 may be quickly and easily removed from the compartment 200, and a replacement container housing 102 may be inserted into the compartment 200.

The lavatory 202 is an example of an interior monument and enclosed space into which the trash containment system 100 may be positioned. The trash containment system 100 may also be positioned in various other enclosed spaces, such as a cockpit, galley, or the like within the internal cabin 204, a room within a fixed structure, and/or the like.

Figure 2:
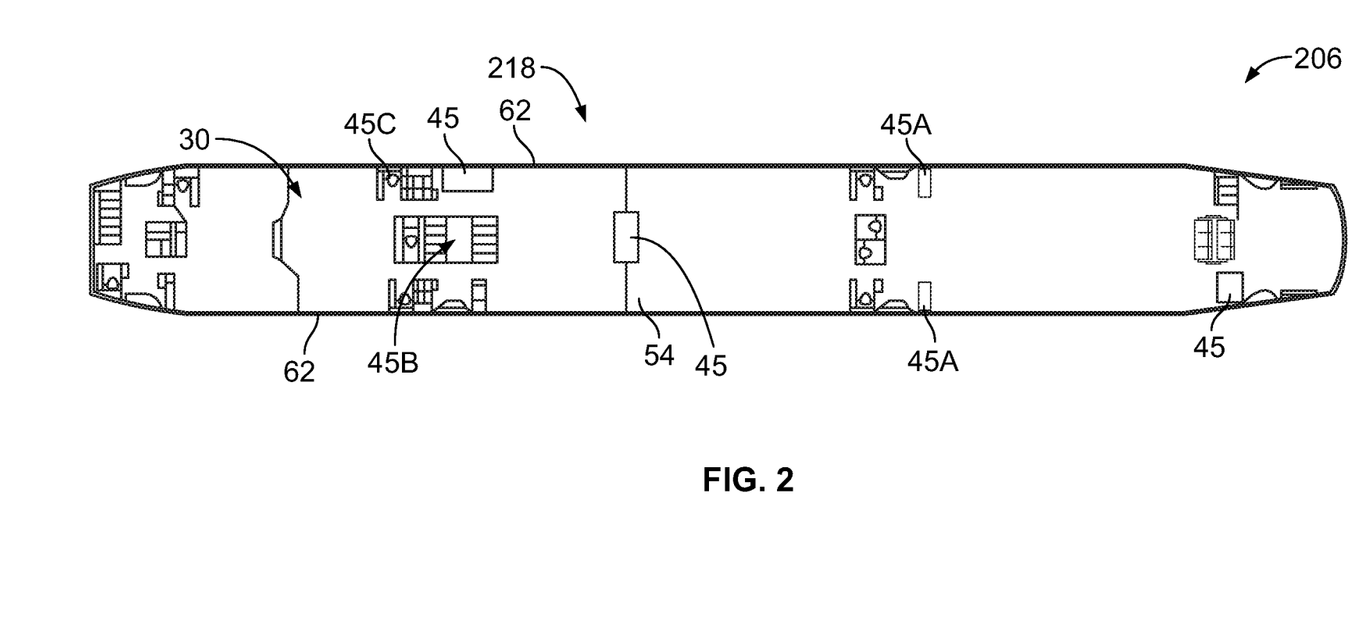
FIG. 2 illustrates a top plan view of an internal cabin of an aircraft, according to an embodiment of the present disclosure.

FIG. 2 illustrates a top plan view of a passenger cabin 30 of the vehicle) 206 according to an embodiment of the present disclosure. The vehicle 206 may be an aircraft that includes a propulsion system that may include two turbofan engines, for example. Optionally, the propulsion system may include more engines than shown. The engines are carried by wings of the aircraft. In other embodiments, the engines may be carried by a fuselage 218 and/or an empennage. The empennage may also support horizontal stabilizers and a vertical stabilizer.

Alternatively, instead of an aircraft, embodiments of the present disclosure may be used with various other vehicles, such as automobiles, buses, locomotives and train cars, watercraft, and the, like. Further, embodiments of the present disclosure may be used with respect to fixed structures, such as commercial and residential buildings.

The passenger cabin 30 is within the fuselage 218. For example, one or more fuselage wall members 62 may define the passenger cabin 30. The passenger cabin 30 may include multiple sections or zones.

The passenger cabin 30 includes several interior monuments 45 located within the same or different sections of the passenger cabin 30. At least some of the monuments 45 may lavatories, galleys, or the like. Although five monuments 45 are shown in FIG. 2, the aircraft 206 may have different numbers and/or locations of the monuments 45 in other embodiments. The monuments 45 may be closets 45A, rest bunks 45B, lavatories 45C, or the like. For example, rest bunks 45B are elongated compartments configured to accommodate an adult person lying down to enable a person on the crew to rest during a trip of the aircraft 206. The passenger cabin 30 includes passenger seats (not shown in FIG. 2). One or more of the interior monuments 45 may include a trash containment system 100, such as shown and described with respect to FIG. 1.

Figure 3:
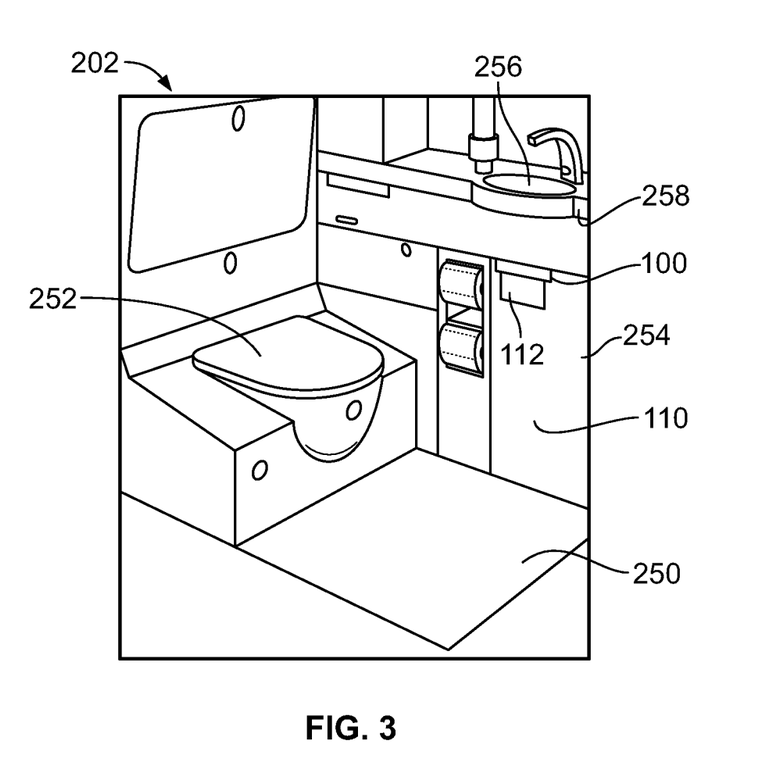
FIG. 3 illustrates a perspective internal view of a lavatory including the trash containment system of FIG. 1.

FIG. 3 illustrates a perspective internal view of a lavatory 202 including the trash containment system 100 of FIG. 1. The lavatory 202 may be onboard a vehicle, such as the vehicle 206 shown in FIG. 1. Optionally, the lavatory 202 may be onboard various other vehicles. In other embodiments, the lavatory 202 may be within a fixed structure, such as a commercial or residential building.

The lavatory 202 includes a base floor 250 that supports a toilet 252, cabinets 254, and a sink 256. A trash containment system 100 is located within the lavatory 202, such as underneath or otherwise proximate to the sink 256. For example, the trash containment system 100 may be positioned underneath a counter 258 that supports the sink 256. The door 110 of the trash containment system 100 may provide a front, decorative face of a cabinet structure within the lavatory 202. The inlet 112 allows trash to be deposited into the trash containment system 100.

Figure 4:
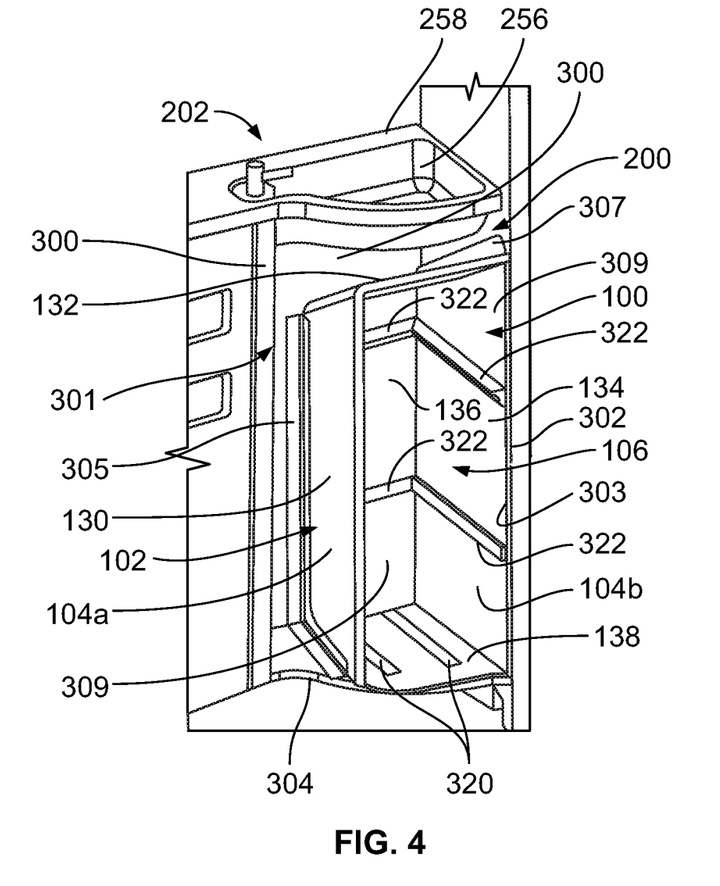
FIG. 4 illustrates a perspective front view of the trash containment system of FIG. 1 within a compartment of a lavatory.

FIG. 4 illustrates a perspective front view of the trash containment system 100 of FIG. 1 within a compartment 200 of a lavatory 202. Referring to FIGS. 1 and 4, the compartment 200 may be formed by interior walls 300 of a cabinet 301, and/or one or more walls 302 of the lavatory 202. The cabinet 301 also includes a base 304 that connects to the interior walls 300 and the wall(s) 302.

In at least one embodiment, the container housing 102 includes a first panel 104a connected to a second panel 104b. The first panel 104a is formed and folded to provide a first lateral wall 130 and a top wall 132. The first lateral wall 130 is generally perpendicular to the base 304, and extends upwardly from the base 304. The top wall 132 may be angled in relation to the base 304. Optionally, the top wall 132 may be parallel to the base 304.

The second panel 104a is formed and folded to provide a second lateral wall 134, a rear wall 136, and a base wall 138. The base wall 138 overlays a portion of the base 304 of the compartment 200 and connects to lower edges of the first lateral wall 130, the second lateral wall 134, and the rear wall 136. The second lateral wall 134 is opposite from the first lateral wall 130. The first and second lateral walls 130 and 134 may be parallel to one another. The second lateral wall 134 may overlay a portion of an interior surface 303 of the wall 302 of the lavatory 202. Optionally, the second lateral wall 134 may be spaced apart from the wall 302. The rear wall 136 connects to rear edges of the first lateral wall 130, the top wall 132, and the second lateral wall 134. The retaining chamber 106 is defined between the first lateral wall 130, the top wall 132, the second lateral wall 134, the rear wall 136, and the base wall 138. The rear wall 136 may overlay an interior surface of a rear interior wall 300 of the compartment 200, or may be spaced apart therefrom. As shown, the first lateral wall 130 is spaced apart from an interior surface of a lateral interior wall 300 of the compartment 200. Optionally, the first lateral wall 130 may overlay at least a portion of the lateral interior wall 300. In at least one embodiment, the base wall 138 may be spaced apart from the base 304. The door 110 is not shown in FIG. 4. In at least one other embodiment, the container housing 102 may not include the base wall 138. Instead, the base 304 of the compartment 200 may form a lower surface of the retaining chamber 106.

One or more securing brackets 305 and 307 may secure the container housing 102 within the compartment 200. More or less securing brackets than shown may be used. In at least one other embodiment, the compartment 200 may not include any securing brackets. For example, the container housing 102 may be secured within the compartment 200 through fasteners, adhesives, and/or the like.

As described above, the container housing 102 may be formed from two panels 104, namely the first panel 104a and the second panel 104b, which are shaped and formed to define the retaining chamber 106. Optionally, the container housing 102 may be formed from a single panel 104 that is shaped and formed to define the retaining chamber 106. In at least one other embodiment, three or more panels 104 may be used to form the retaining chamber 106.

One or more guide rails 320 may be secured on an upper surface of the base wall 138. The guide rails 320 are configured to guide the trash container 108 into a secure position within the retaining chamber 106. Additionally, rails 322 may be secured to interior surfaces 309 of the first lateral wall 130, the second lateral wall 134, the rear wall 136, and/or the door 110 (not shown in FIG. 4). The rails 322 may also be configured to guide the trash container 108 into a secure position within the retaining chamber 106. The rails 322 securely retain the trash container 108 within the retaining chamber 106. The rails 322 prevent the trash container 108 from shifting within the retaining chamber 106, and eliminate or reduce the possibility of the trash container 108 from dislodging or otherwise shifting when the vehicle 206 is moving, for example. The retaining chamber 106 may include more or less guide rails 320 and rails 322 than shown. In at least one embodiment, the retaining chamber 106 may not include the guide rails 320 and/or the rails 322.

Figure 5:
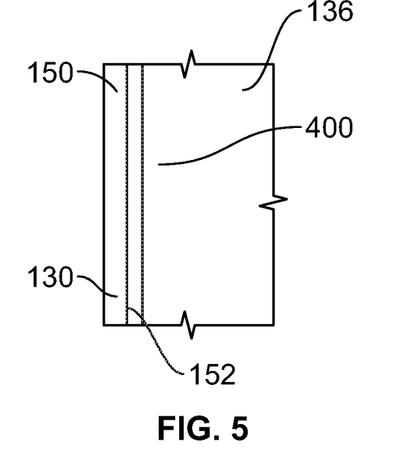
FIG. 5 illustrates a front view of a seal coupled to a first lateral wall.

FIG. 5 illustrates a front view of a seal 400 coupled to a first lateral wall 130. Referring to FIGS. 4 and 5, the seal 400 is secured at a front edge 150 and/or an internal surface 152 of the first lateral wall 130 proximate to the front edge 150. The seal 400 may also extend around the top wall 132, the second lateral wall 134, and the base wall 138 in a similar manner. The seal 400 extends around a front periphery between the panels 104a, 104b. As such, the seal 400 provides a sealing interface between the panels 104a, 104b and the closed door 110 (shown in FIG. 1). The seal 400 may include a single, contiguous member or multiple connected segments that extend(s) around a front of the retaining chamber 106. The seal 400 is configured to sealingly engage a rear surface of the door 110 when the door is closed. In this manner, the seal 400 prevents air from passing into the retaining chamber 106 between an interface of the panels 104a and 104b and the door 110. As such, if a fire ignites within the retaining chamber 106, airflow to the fire is restricted, and the fire quickly extinguishes.

The seal 400 may be formed of an elastomeric material, such as rubber, an intumescent material, and/or the like. In at least one embodiment, the seal 400 may be a P-seal.

Figure 6:
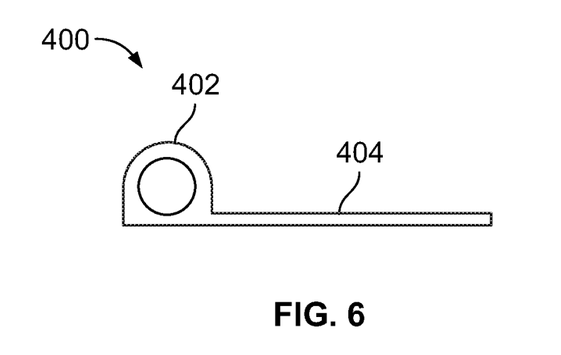
FIG. 6 illustrates a top view of a seal.

FIG. 6 illustrates a top view of a seal 400. The seal 400 may be a P-seal having an expanded head 402 connected to a flap 404. Referring to FIGS. 1, 5, and 6, the flap 404 may be secured to a portion of a panel 104, while the head 402 is configured to provide a sealing interface between the door 110 (when closed) and panel 104.

Figure 7:
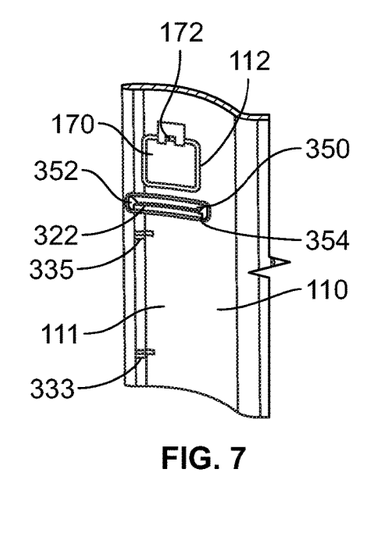
FIG. 7 illustrates a perspective rear view of a door.

FIG. 7 illustrates a perspective rear view of the door 110. The door 110 may be moveably secured to the cabinet 301, shown in FIG. 4. When closed, a rear surface 111 of the door 110 closes against the front edges of the panels 104a and 104b. The seal 400 (shown in FIGS. 5 and 6) may sealingly engage portions of the rear surface 111 when the door 110 is closed.

The door 110 may include one or more latches 333 and 335 (such a first latch 333 proximate a bottom end of the door 110 and a second latch 335 proximate a top end of the door 110) that are configured to securely latch onto portions (such as edges) of the panels 104 (shown in FIGS. 1 and 4) to secure the door 110 in a closed position. The dual latches 333 and 335 can ensure that both a top and bottom of the door 110 can remain tightly coupled to the container housing 102 (shown in FIGS. 1 and 4), which can thereby reduce the potential of air, oxygen, and/or other gases from entering the trash containment system 100 (shown in FIG. 1).

The door 110 includes the inlet 112, which may include an access flap 170 moveably secured to the door 110 through a hinge 172. A rail 322 is secured to the rear surface 111 of the door 110 underneath the inlet 112. The rail 322 may be formed as a piece of extruded material, such as plastic or rubber, which is lighter than metal (thereby reducing weight). The rail 322 may include a trash director 350 that downwardly slopes from a top end 352 towards a bottom end 354. The upper most rail 322 secured to the door 110, along with the other upper most rails 322 positioned on the panels 104 may form part of a chute that includes the inlet 112 (even though the rails 322 may be separated from the door 110 and/or the inlet 112) that extends from the door 110 towards the trash container 108 within the retaining chamber 106 (as shown in FIG. 1, for example).

Figure 8:
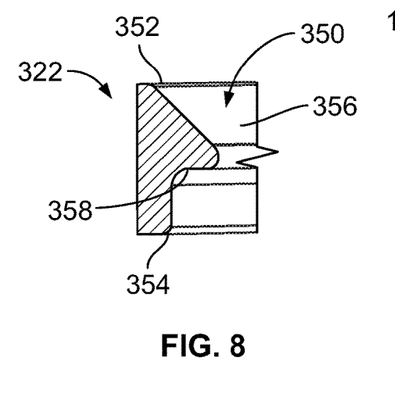
FIG. 8 illustrates a perspective lateral view of a rail.

FIG. 8 illustrates a perspective lateral view of the rail 322. As shown, the trash director 350 includes a sloped surface 356 that downwardly slopes from the top end 352 towards the bottom end 354. The sloped surface 356 terminates at a flat retaining ridge 358. Referring to FIGS. 1, 7, and 8, as trash is deposited into the inlet 112, the trash is directed towards and into the trash container 108 via the downwardly sloped surface 356 of the trash director 350.

Figure 9:
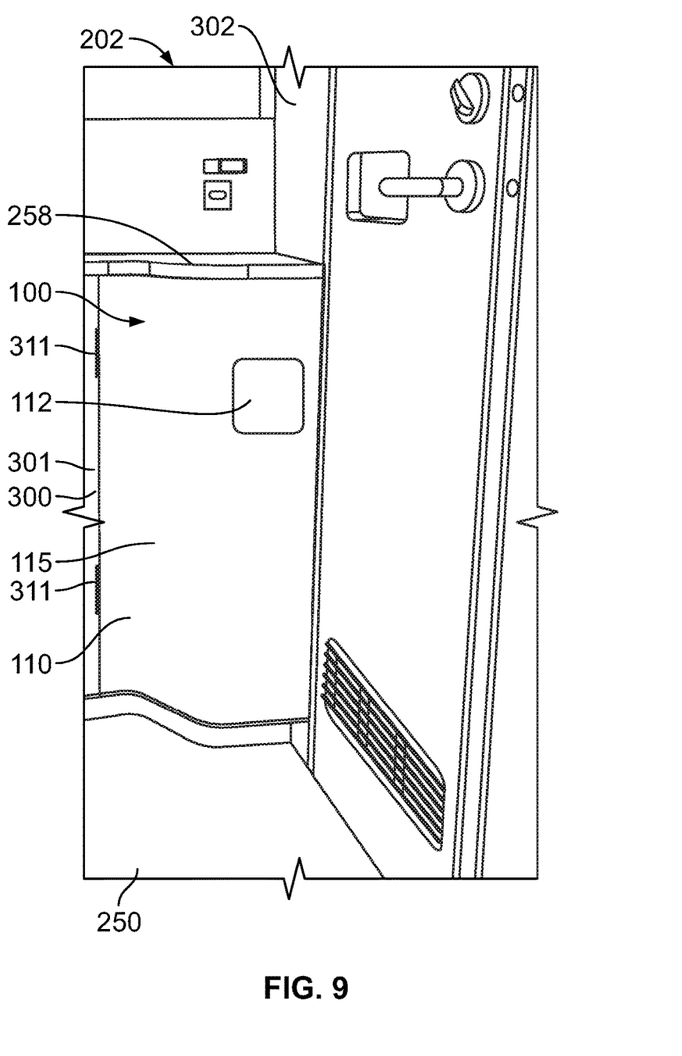
FIG. 9 illustrates a perspective front view of a trash containment system within a lavatory.

FIG. 9 illustrates a perspective front view of the trash containment system 100 within a lavatory 202. The door 110 is moveably coupled to a wall 300 of a cabinet 301, such as through one or more hinges 311. As shown, the door 110 may have a decorative front surface 115, which may blend in with a front surface of the cabinet 301.

Figure 10:
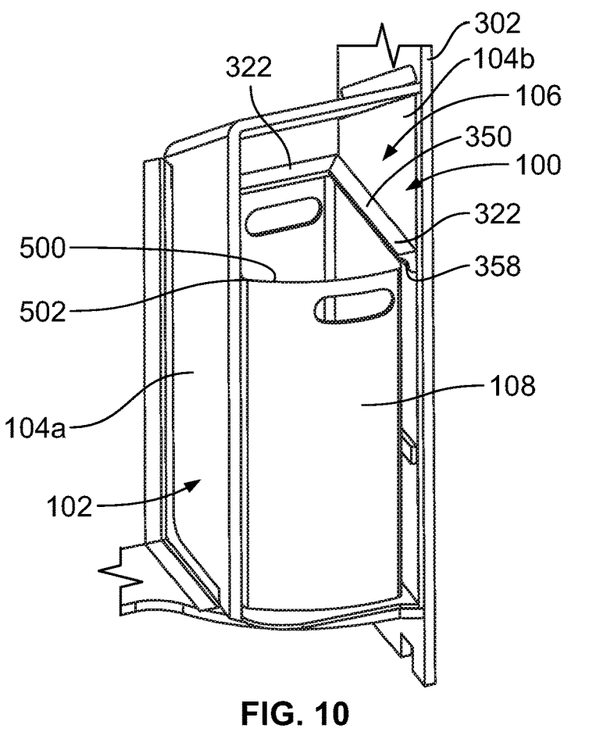
FIG. 10 illustrates a perspective front view of a trash container within a retaining chamber of a container housing of a trash containment system.
Figure 11:
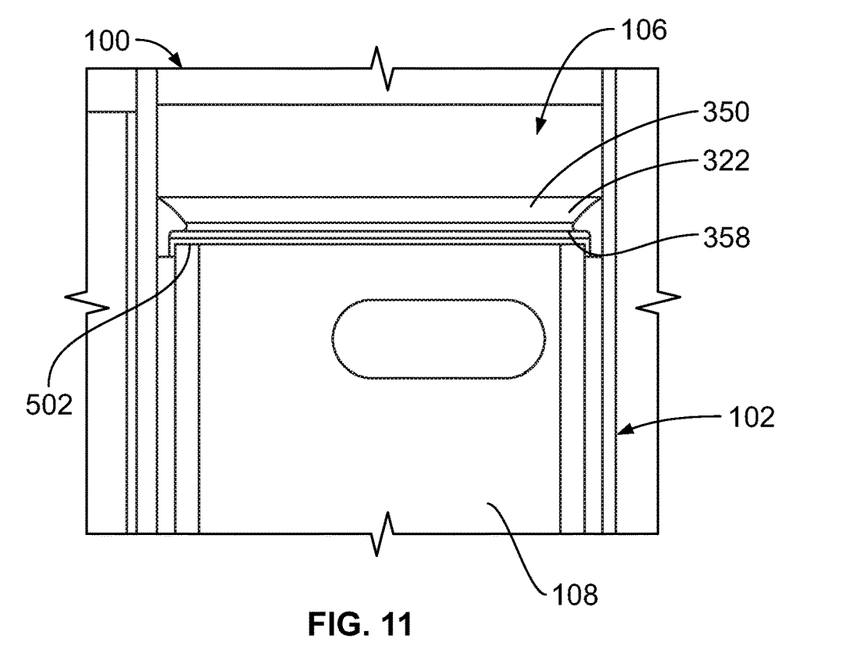
FIG. 11 illustrates a front view of a portion of a trash container within a retaining chamber of a container housing of a trash containment system.

FIG. 10 illustrates a perspective front view of the trash container 108 within the retaining chamber 106 of the container housing 102 of the trash containment system 100. FIG. 11 illustrates a front view of a portion of the trash container 108 within the retaining chamber 106 of the container housing 102 of the trash containment system 100. Referring to FIGS. 1, 10, and 11, the trash container 108 provides a bin, basket, can, or other such receptacle that defines a trash chamber 500. For example, a trash bag may be disposed within the trash chamber 500. Trash deposited into the inlet 112 is directed into the trash chamber 500. For example, rails 322 positioned over a top perimeter edge 502 of the trash container 108 direct the trash towards and into the trash chamber 500. The downward slope of the trash directors 350 aid in directing the trash towards and into the trash chamber 500. Further, the retaining ridges 358 of the rails 322 are positioned over the perimeter edge 502 of the trash container 108, and thereby constrain the trash container 108 within the retaining chamber 106. For example, the retaining ridges 358 provide barriers into which the perimeter edge 502 cannot pass in an upward direction.

Figure 12:
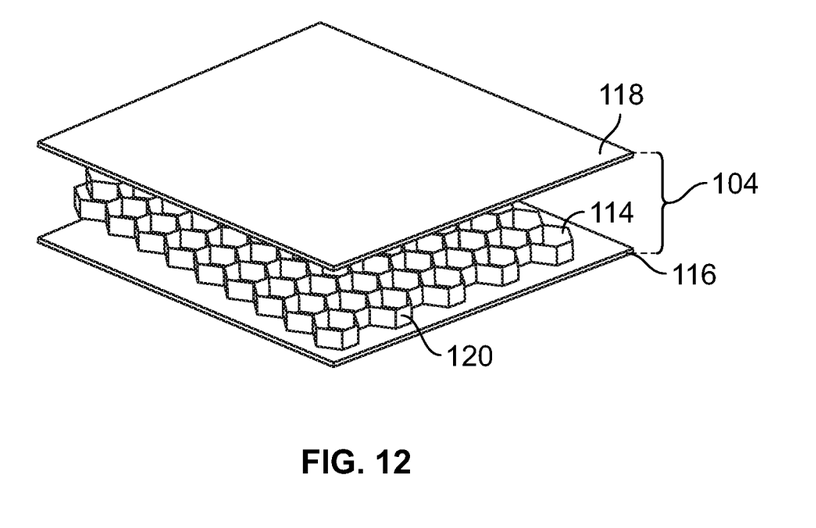
FIG. 12 illustrates a perspective exploded view of a panel.

FIG. 12 illustrates a perspective exploded view of a panel 104. The panel(s) 104 of the container housing 102 (shown in FIG. 1) may be formed as composite panel(s), as shown and described with respect to FIG. 12.

The panel 104 may include a core 114 sandwiched between opposed first and second skins 116 and 118. The core 114 may include a plurality of interconnected honeycomb cells 120. In at least one other embodiment, the core 114 may be a solid layer or porous foam layer. The core 114 may be formed of aramid fibers, and/or polyamides, for example. The first and second skins 116 and 118 may be or include one or more pre-impregnated epoxy resin layers that include fibers, such as fiberglass, graphite, Kevlar, and/or the like. The first and second skins 116 and 118 may be identical to one another. In at least one other embodiment, the first and second skins 116 and 118 may include more or less layers than one another. By forming the panel(s) 104 from a composite material, instead of metal, the weight of the container housing 102 is reduced.

Figure 13:
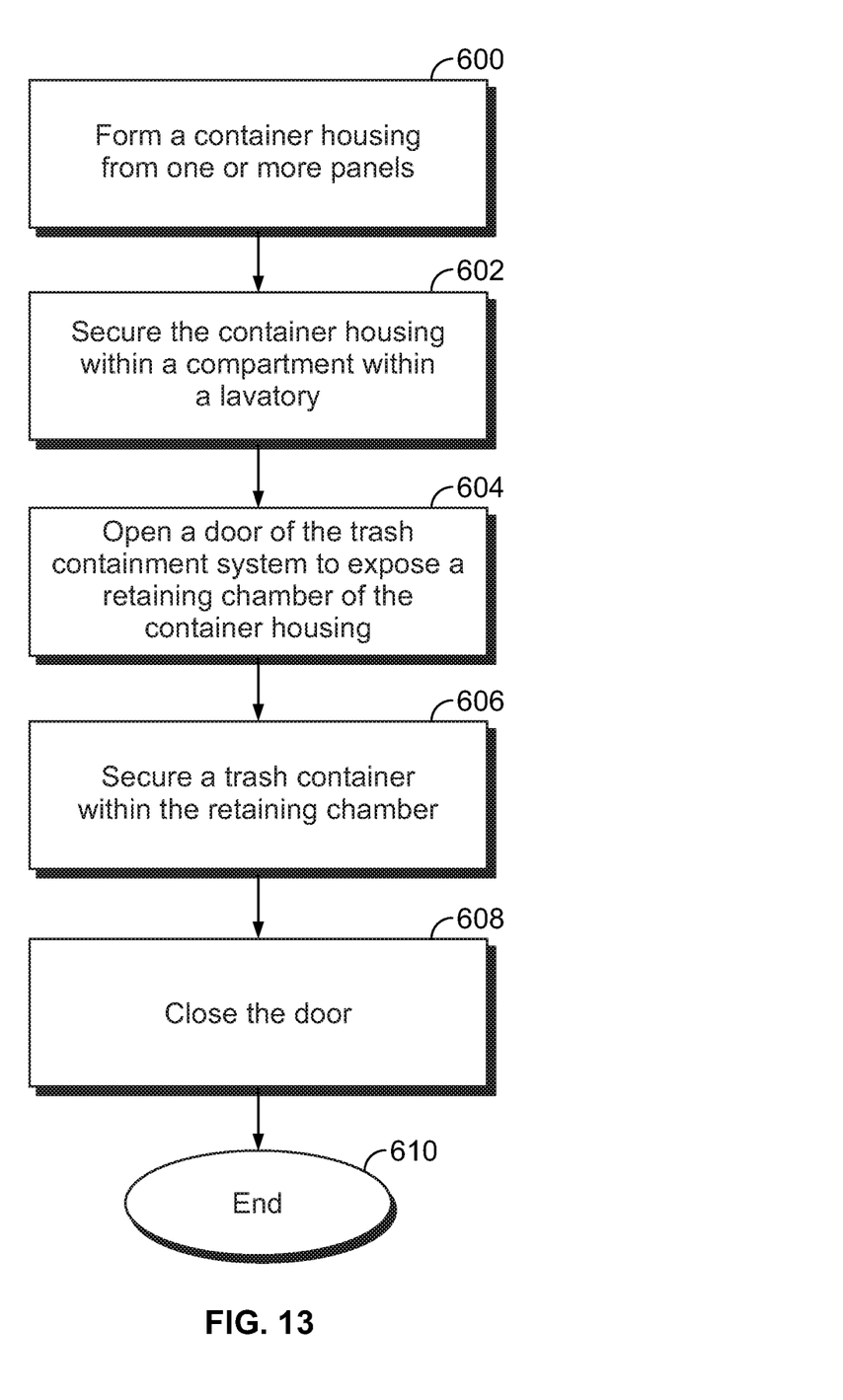
FIG. 13 illustrates a flow chart of a method of forming a trash containment system within a lavatory, according to an embodiment of the present disclosure.

FIG. 13 illustrates a flow chart of a method of forming a trash containment system 100 within a lavatory 202, according to an embodiment of the present disclosure. Referring to FIGS. 1 and 13, the method includes 600, at which a container housing 102 is formed from one or more panels 104. In at least one embodiment, at 602, the container housing 102 is secured within a compartment 200 within the lavatory 202. At 604, a door 110 of the trash containment system 100 is opened to expose a retaining chamber 106 of the container housing 102. At 606, a trash container 108 is secured within the retaining chamber 106. At 608, the door 110 is then closed. At 610, the method may end.

In at least one embodiment, a method of making a trash containment system 100 includes forming a container housing 102 from one or more panels 104 that define a retaining chamber 106 within the container housing 102, and coupling a door 110 adjacent the container housing 102 such that the door 110 forms a front of the container housing 102.

The forming may include coupling a first panel 104a and a second panel 102b together to define the retaining chamber 106. The forming may include folding the first panel 104a to define a first lateral wall 130 and a top wall 132, and folding the second panel 104b to define a second lateral wall 134, a rear wall 136, and a base wall 138. The second panel 104b is connected to the first panel 104a. The retaining chamber 106 is defined by the first lateral wall 130, the top wall 132, the second lateral wall 134, the rear wall 136, and the base wall 138. The first panel 104a and the second panel 104b overlay at least portions of interior surfaces of one or both of a compartment 200 or a wall of a lavatory 202.

The method may also include coupling a first latch 333 and a second latch 335 to the door 110.

The method may also include positioning rails 322 on interior surfaces 309 of the one or more panels 104. The positioning the rails 322 may include forming a trash director 350 that downwardly slopes from a top end 352 towards a bottom end 354. The trash director 350 is configured to direct trash towards the retaining chamber 106. The rails 322 are configured to securely retain the trash container 108 within the retaining chamber 106.

The method may also include positioning a seal 400 around a front periphery of the one or more panels 104. The seal 400 provides a sealing interface between the one or more panels 104 and the door 110 in the closed position.

As described herein, embodiments of the present disclosure provide a light and cost effective trash container system that may be used onboard a vehicle, such as a commercial aircraft. Further, the trash container system that may be efficiently manufactured and installed onboard a vehicle.

The foregoing summary and detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first", "second", and "third", etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A trash containment system comprising:
a container housing including one or more panels that define a retaining chamber within the container housing, wherein the retaining chamber is configured to removably receive and retain a trash container, wherein the container housing is configured to be retained within a compartment of a monument;
rails secured to interior surfaces of the one or more panels, wherein the rails are configured to retain the trash container within the retaining chamber, wherein the rails comprise a trash director that downwardly slopes from a top end towards a bottom end, wherein the trash director is configured to direct trash towards the retaining chamber; and
a door that forms a front of the container housing, wherein the door is configured to be moved between an open position and a closed position, wherein the retaining chamber is exposed in the open position and closed in the closed position, and wherein the door comprises:
an inlet that leads to the retaining chamber; and
an access flap moveably secured to the inlet.

2. The trash containment system of claim 1, wherein the one or more panels comprise:
  a first panel; and
  a second panel, wherein the first panel and the second panel define the retaining chamber.

3. The trash containment system of claim 1, wherein the one or more panels comprise:
  a first panel that provides a first lateral wall and a top wall; and
  a second panel connected to the first panel and that provides a second lateral wall, a rear wall, and a base wall, wherein the retaining chamber is defined by the first lateral wall, the top wall, the second lateral wall, the rear wall, and the base wall, wherein the first panel and the second panel overlay at least portions of interior surfaces of one or both of the compartment or a wall of the monument.

4. The trash container system of claim 1, further comprising a seal around a front periphery of the one or more panels, wherein the seal provides a sealing interface between the one or more panels and the door in the closed position.

5. The trash containment system of claim 1, wherein the compartment is defined by one or both of interior walls of the cabinet or one or more walls of the monument.

6. The trash containment system of claim 1, further comprising:
  a first latch coupled to the door; and
  a second latch coupled to the door.

7. The trash containment system of claim 1, wherein the one or more panels are formed of a composite material.

8. The trash containment system of claim 7, wherein the composite material comprises a core sandwiched between opposed first and second skins, wherein the core includes a plurality of interconnected honeycomb cells.

9. A method of making a trash containment system, the method comprising:
  forming a container housing from one or more panels that define a retaining chamber within the container housing;
  coupling a door adjacent the container housing such that the door forms a front of the container housing;
  coupling the door to a cabinet adjacent to a compartment; and
  positioning rails on interior surfaces of the one or more panels, wherein the positioning the rails comprises forming a trash director that downwardly slopes from a top end towards a bottom end, wherein the trash director is configured to direct trash towards the retaining chamber, wherein the rails are configured to securely retain the trash container within the retaining chamber.

10. The method of claim 9, wherein the forming comprises coupling a first panel and a second panel together to define the retaining chamber.

11. The method of claim 9, wherein the forming comprises:
  folding a first panel to define a first lateral wall and a top wall; and
  folding a second panel to define a second lateral wall, a rear wall, and a base wall, the second panel being connected to the first panel, wherein the retaining chamber is defined by the first lateral wall, the top wall, the second lateral wall, the rear wall, and the base wall, wherein the first panel and the second panel overlay at least portions of interior surfaces of one or both of a compartment or a wall of a lavatory.

12. The method of claim 9, further comprising coupling a first latch and a second latch to the door.

13. The method of claim 9, further comprising positioning a seal around a front periphery of the one or more panels, wherein the seal provides a sealing interface between the one or more panels and the door in the closed position.

14. An interior monument for use in a vehicle, the interior monument comprising:
  a cabinet having a compartment; and
  a trash containment system within the cabinet, the trash containment system comprising:
    a container housing including a first panel and a second panel formed of a composite material including a core sandwiched between opposed first and second skins, wherein the core includes a plurality of interconnected honeycomb cells, wherein the first panel and the second panel are formed and coupled together to define a retaining chamber, wherein the retaining chamber is configured to removably receive and retain a trash container, wherein the container housing is retained within the compartment;
    rails secured to interior surfaces of one or both of the first panel or the second panel, wherein the rails are configured to retain the trash container within the retaining chamber, and wherein the rails comprise a trash director that downwardly slopes from a top end towards a bottom end, wherein the trash director is configured to direct trash towards the retaining chamber; and
    a door that forms a front of the container housing and is configured to be moved between an open position and a closed position, wherein the door is coupled to the cabinet adjacent the compartment, wherein the door comprises:
      an inlet that leads to the retaining chamber; and
      an access flap moveably secured to the inlet.

15. The interior monument of claim 14, further comprising:
  a first latch positioned proximate to a bottom edge of the door; and
  a second latch positioned proximate to a top edge of the door, wherein the first latch and the second latch are configured to latchably engage the first panel and the second panel.

16. The interior monument of claim 14, further comprising a seal around a front periphery of the one or more panels, wherein the seal provides a sealing interface between the one or more panels and the door in the closed position.

17. The trash containment system of claim 1, wherein the door is coupled to a cabinet adjacent the compartment.

18. A trash containment system comprising:
  a container housing including one or more panels that define a retaining chamber within the container housing, wherein the retaining chamber is configured to removably receive and retain a trash container, wherein the container housing is configured to be retained within a compartment of a monument, wherein the one or more panels comprise a first panel that provides a first lateral wall and a top wall; and a second panel connected to the first panel and that provides a second lateral wall, a rear wall, and a base wall, wherein the retaining chamber is defined by the first lateral wall, the top wall, the second lateral wall, the rear wall, and the base wall, and wherein the first panel and the second panel overlay at least portions of interior surfaces of one or both of the compartment or a wall of the monument;

rails secured to interior surfaces of one or both of the first panel or the second panel, wherein the rails are configured to retain the trash container within the retaining chamber, and wherein the rails comprise a trash director that downwardly slopes from a top end towards a bottom end, wherein the trash director is configured to direct trash towards the retaining chamber; and a door that forms a front of the container housing, wherein the door is configured to be moved between an open position and a closed position, wherein the retaining chamber is exposed in the open position and closed in the closed position, and wherein the door comprises:

an inlet that leads to the retaining chamber; and an access flap moveably secured to the inlet.

19. A trash containment system comprising:

a container housing including one or more panels that define a retaining chamber within the container housing, wherein the one or more panels are formed of a composite material, wherein the retaining chamber is configured to removably receive and retain a trash container, and wherein the container housing is configured to be retained within a compartment of a monument;

rails secured to interior surfaces of the one or more panels, wherein the rails are configured to retain the trash container within the retaining chamber, and wherein the rails comprise a trash director that downwardly slopes from a top end towards a bottom end, wherein the trash director is configured to direct trash towards the retaining chamber; and a door that forms a front of the container housing, wherein the door is configured to be moved between an open position and a closed position, wherein the retaining chamber is exposed in the open position and closed in the closed position, and wherein the door comprises:

an inlet that leads to the retaining chamber; and an access flap moveably secured to the inlet.

20. An interior monument for use in a vehicle, the interior monument comprising:

a cabinet having a compartment; and a trash containment system within the cabinet, the trash containment system comprising:

a container housing including a first panel and a second panel formed of a composite material, wherein the first panel and the second panel are formed and coupled together to define a retaining chamber, wherein the retaining chamber is configured to removably receive and retain a trash container, wherein the container housing is retained within the compartment;

rails secured to interior surfaces of one or both of the first panel or the second panel, wherein the rails are configured to retain the trash container within the retaining chamber, and wherein the rails comprise a trash director that downwardly slopes from a top end towards a bottom end, wherein the trash director is configured to direct trash towards the retaining chamber; and a door that forms a front of the container housing and is configured to be moved between an open position and a closed position, wherein the door is coupled to the cabinet adjacent the compartment, wherein the door comprises:

an inlet that leads to the retaining chamber; and an access flap moveably secured to the inlet.

* * * * *